United States Patent
Simancas et al.

(10) Patent No.: US 11,091,601 B2
(45) Date of Patent: Aug. 17, 2021

(54) PROCESS FOR PRODUCING AN IN-SITU FOAM

(71) Applicant: BASF SE, Ludwigshafen (DE)

(72) Inventors: Kimberly Simancas, Stuttgart (DE); Rebekka Von Benten, Ludwigshafen (DE); Hans-Joachim Hähnle, Neustadt (DE); Klaus Hahn, Kirchheim (DE); Nikolaus Nestle, Heidelberg (DE); Tatiana Ulanova, Ludwigshafen (DE); Jens Assmann, Neustadt (DE)

(73) Assignee: BASF SE, Ludwigshafen am Rhein (DE)

( * ) Notice: Subject to any disclaimer, the term of this patent is extended or adjusted under 35 U.S.C. 154(b) by 594 days.

(21) Appl. No.: 15/888,525

(22) Filed: Feb. 5, 2018

(65) Prior Publication Data
US 2018/0155517 A1    Jun. 7, 2018

Related U.S. Application Data

(62) Division of application No. 14/430,378, filed as application No. PCT/EP2013/068996 on Sep. 13, 2013, now abandoned.

(30) Foreign Application Priority Data

Sep. 24, 2012   (EP) .................................. 12185665

(51) Int. Cl.
*C08J 9/12* (2006.01)
*C04B 38/10* (2006.01)
(Continued)

(52) U.S. Cl.
CPC .............. *C08J 9/122* (2013.01); *C04B 26/12* (2013.01); *C04B 26/16* (2013.01); *C04B 38/10* (2013.01);
(Continued)

(58) Field of Classification Search
CPC .......... C04B 38/10; C04B 26/12; C04B 26/16; C08J 9/30; C08J 9/122; C08J 9/0033; C08J 9/0066
See application file for complete search history.

(56) References Cited

U.S. PATENT DOCUMENTS 3,737,332 A   6/1973 Sennett et al.
3,933,514 A * 1/1976 Banks ..................... C04B 28/26
                                                         106/602
(Continued)

FOREIGN PATENT DOCUMENTS

CA       2367730 A1    9/2000
DE     25 42 471 A1    4/1977
(Continued)

OTHER PUBLICATIONS

Singh, S.N. "Blowing Agents" Handbook of Polymer Foams.: Smithers Rapra. (Year: 2004).*
(Continued)

*Primary Examiner* — Michael M Dollinger
*Assistant Examiner* — Christina H. W. Rosebach
(74) *Attorney, Agent, or Firm* — Faegre Drinker Biddle & Reath LLP

(57) ABSTRACT

A system for producing an in-situ foam, which comprises the components
  from 50 to 98% by weight of one or more inorganic fillers A),
  from 1 to 48% by weight of one or more water-soluble, cationic polymers B),
  from 0.5 to 48% by weight of one or more surfactants C),
  from 0.01 to 5% by weight of one or more crosslinkers D) which are capable of reacting with the polymers B),
  from 0 to 20% by weight of one or more additives E),
where the percentages by weight of the components A) to E) are based on the nonaqueous fraction and the sum of A) to
(Continued)

E) is 100% by weight, process for producing an in-situ foam using the components of the system and foaming by means of a gas or a gas mixture and use for thermal insulation and filling of hollow spaces and hollow bodies.

20 Claims, 1 Drawing Sheet

(51) Int. Cl.
| | |
|---|---|
| C08J 9/00 | (2006.01) |
| C08J 9/30 | (2006.01) |
| C04B 26/16 | (2006.01) |
| C04B 26/12 | (2006.01) |
| F16L 59/02 | (2006.01) |
| C04B 103/00 | (2006.01) |
| C04B 103/40 | (2006.01) |
| C04B 111/28 | (2006.01) |

(52) U.S. Cl.
CPC ........... *C08J 9/0033* (2013.01); *C08J 9/0066* (2013.01); *C08J 9/30* (2013.01); *F16L 59/028* (2013.01); *C04B 2103/0062* (2013.01); *C04B 2103/40* (2013.01); *C04B 2111/28* (2013.01); *C08J 2333/24* (2013.01); *C08J 2339/02* (2013.01)

(56) References Cited

U.S. PATENT DOCUMENTS

| | | | |
|---|---|---|---|
| 8,124,662 B2 | 2/2012 | Iannace et al. | |
| 8,697,764 B2 | 4/2014 | Ulanova et al. | |
| 8,822,557 B2 | 9/2014 | Ulanova et al. | |
| 8,926,797 B2 | 1/2015 | Jehn-Rendu et al. | |
| 2004/0201120 A1* | 10/2004 | Colbert | B01F 3/04446 |
| | | | 264/45.8 |
| 2009/0030099 A1 | 1/2009 | Chino | |
| 2010/0077938 A1* | 4/2010 | Zamora | C04B 28/02 |
| | | | 106/677 |
| 2011/0034571 A1 | 2/2011 | Hahn et al. | |
| 2011/0049411 A1 | 3/2011 | Ulanova | |
| 2012/0208910 A1* | 8/2012 | Ulanova | C04B 38/02 |
| | | | 521/83 |

FOREIGN PATENT DOCUMENTS

| | | |
|---|---|---|
| DE | 199 12 988 C1 | 8/2000 |
| JP | 2011027931 A | 2/2011 |
| WO | WO-2008/007187 A2 | 1/2008 |
| WO | WO-2009109537 A1 | 9/2009 |
| WO | WO-2009133046 A1 | 11/2009 |
| WO | WO-2010/145956 A1 | 12/2010 |
| WO | WO-2011051170 A1 * | 5/2011 ............. C04B 38/02 |

OTHER PUBLICATIONS

Hedlin, C.P. "Heat Flow through a roof insulation having moisture contents between 0 and 1% by volume, in summer" Reprinted from ASHRAE Transactions 1988 part 2, p. 1579-1594.
International Search Report for PCT/EP2013/068996 dated Dec. 9, 2013.

* cited by examiner

PROCESS FOR PRODUCING AN IN-SITU FOAM

CROSS-REFERENCE TO RELATED APPLICATIONS

This application is a divisional application of U.S. Ser. No. 14/430,378, filed Mar. 23, 2015 which is a national stage application (under 35 U.S.C. § 371) of PCT/EP2013/068996, filed Sep. 13, 2013, which claims benefit of European Application No. 12185665.2, filed Sep. 24, 2012, all of which are incorporated herein by reference in their entirety.

The present invention relates to a system and a process for producing an in-situ foam and also its use.

BACKGROUND OF THE INVENTION

In-situ foams based on urethanes, curable aminoplastic condensates or phenolic resins have been known for a long time. A disadvantage is that they are flammable and shrink on drying. DE 25 42 471 describes a process for producing low-shrinkage foams from curable aminoplastic condensates in the presence of shrinkage- and flammability-reducing reaction products of orthoboric acid and polyhydric alcohols or polyalkylene glycol ethers of polyhydric alcohols.

WO 2011/051170 describes a process for producing an elastic inorganic-organic hybrid foam having good heat and sound absorption properties. The foam is obtained by foaming a mixture of gypsum or kaolin, an aqueous polyvinylamine solution, a volatile organic compound as blowing agent, an emulsifier and crosslinker. Owing to the blowing agents used, flush filling of hollow spaces with foam is not possible.

WO 2009/109537 describes a process for producing a foam having a high flame resistance and low density by curing a mechanical or blown foam composed of an aqueous composition comprising alkali metal silicates, surfactants and an aqueous polymer dispersion. Film formation by drying of the polymer dispersion is too slow for use as in-situ foam.

JP-A 11-27931 describes a flame-resistant spray foam based on polyurethanes which is obtained by mixing an aqueous phosphoric acid solution and optionally inorganic fillers with a mixture of urethane prepolymers comprising NCO groups and calcium carbonate under superatmospheric pressure.

DE 199 12 988 C1 discloses filler-comprising foams based on polyurethanes and their suitability as thermal insulation and insulating materials and also as fire retardant foams.

WO 2008/007187 describes a hybrid foam based on polyurethanes and inorganic fillers having good thermal and acoustic insulation properties, permeability and flame protection and also good adhesion to concrete.

DESCRIPTION OF THE INVENTION

If in-situ foams based on polyurethanes are used for filling virtually closed hollow spaces, the formation of $CO_2$ in the reaction of the components can lead to a high pressure buildup in the hollow spaces, so that the walls burst.

Figure 1:
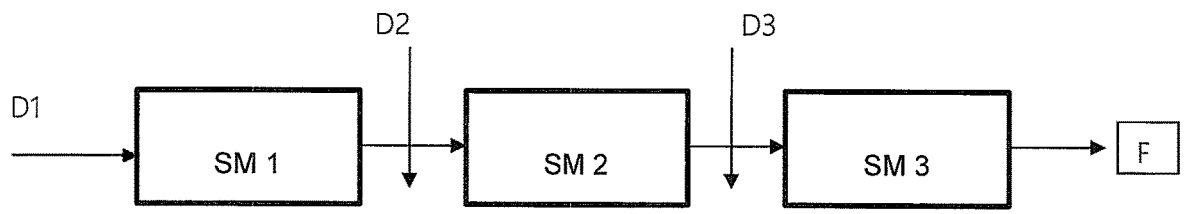
FIG. 1 shows an apparatus with three static mixers and three metering devices.

It was an object of the present invention to remedy the abovementioned disadvantages and provide a system and a process for producing an in-situ foam which displays low shrinkage and low emissions and is sufficiently solid to be cut within a short time. Furthermore, it should also allow flush filling of even irregular and/or virtually closed hollow spaces with foam and, for fire protection, have a low heat of combustion, preferably less than 3.0 MJ/kg, very low smoke formation and no dripping of burning material.

The object is achieved by a system for producing an in-situ foam, which comprises the components from 50 to 98% by weight, preferably from 85 to 95% by weight, of one or more inorganic fillers A), from 1 to 48% by weight, preferably from 2 to 10% by weight, of one or more water-soluble, cationic polymers B), from 0.5 to 48% by weight, preferably from 1 to 10% by weight, of one or more surfactants C), from 0.01 to 5% by weight, preferably from 0.1 to 1% by weight, of one or more crosslinkers D) which are capable of reacting with the polymers B), from 0 to 20% by weight, preferably from 1 to 10% by weight, of one or more additives E), where the percentages by weight of the components A) to E) are based on solids or the nonaqueous fraction and the sum of A) to E) is 100% by weight.

Component A)

As component A), the system comprises one or more inorganic fillers, in particular minerals, for example colloidal silica, silicates such as aluminum silicates, in particular kaolin $Al_2O_3*2SiO_3*2\,H_2O$ or kaolinite $Al_4[(OH)_8Si_4O_{10}]$, sulfates such as calcium sulfate, in particular water-containing sulfates $Ca[SO_4]\cdot n\,H_2O$ where $n=\frac{1}{2}$, 2 (gypsum), or mixtures thereof. Particular preference is given to using calcium sulfate, FGD gypsum from flue gas desulfurization plants, aluminum silicates, in particular kaolin, or mixtures thereof.

The component A is preferably used as naturally occurring mineral and has preferably not been surface-treated. The average particle diameter of the component A) is preferably in the range from 0.1 to 10 µm. The density of the component A) is preferably in the range from 2 to 3 $kg/m^3$.

Component B)

As component B), the system comprises one or more cationic polymers. Preference is given to ones which bear primary or secondary amino groups. The polymer B) is water-soluble, i.e. the solubility in water is at least 5% by weight, preferably at least 10% by weight, under standard conditions (20° C., 101.3 kPa) at pH 7. It is used in the form of an aqueous solution, preferably in a concentration of at least 50 g/l, in particular at least 100 g/l.

Examples of cationic polymers B are polymers obtained by polymerization of one or more monomers selected from among vinylamine, allylamine, ethylenimine, vinylimidazole, N-alkyl-aminoethyl acrylate, N-alkylaminoethyl methacrylate, N-alkylaminopropylacrylamide, N-alkyl-aminopropylacrylamide, N,N-dialkylaminoethyl acrylate, N,N-dialkylaminoethyl methacrylate, N,N-dialkylaminopropylacrylamide, N,N-dialkylaminopropylacrylamide.

It is likewise possible to use polymers which bear primary or secondary amino groups and are based on renewable raw materials such as saccharides, e.g. chitosan.

The polymers comprising vinylamide units described in WO 2010/145956 or the copolymers which can be obtained by subsequent partial or complete removal of formyl groups from the N-vinylformamide copolymerized in the polymer to form amino groups.

Preference is given to polymers which are obtained by complete or partial hydrolysis of polymers which can be obtained by polymerization of at least one monomer of the formula

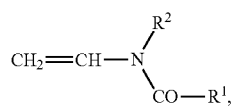

$$CH_2=CH-N\begin{matrix}R^2\\ \\CO-R^1,\end{matrix}\quad (I)$$

where $R^1$, $R^2$=H or $C_1$-$C_6$-alkyl. Preferred monomers of the formula (I) are N-vinylformamide, N-vinyl-N-methylformamide, N-vinylacetamide, N-vinyl-N-methylacetamide, N-vinyl-N-ethyl-acetamide, N-vinyl-N-methylpropionamide and N-vinylpropionamide.

Particular preference is given to polyvinylamine or poly(vinylamine-vinylformamide) copolymers.

The charge densities of the cationic polymers B (without counterions) are generally in the range from 1 to 23 meq/g, preferably in the range from 3 to 14 meq/g, particularly preferably in the range from 4 to 11 meq/g. The weight average molecular weights are usually in the range from 50 000 to 2 000 000, preferably in the range from 100 000 to 1 000 000, particularly preferably in the range from 300 000 to 500 000. Particular preference is given to polyvinylamines and copolymers thereof which are marketed under the trade name Lupamin®. Examples are Lupamin®9030, Lupamin®9050, Lupamin®9095.

Component C)

As component C), the system comprises one or more surfactants which are used for forming and stabilizing the foam. It is possible to use anionic, cationic, nonionic or amphoteric surfactants as surfactants.

Suitable anionic surfactants are diphenylene oxide sulfonates, alkanesfulonates and alkylbenzenesulfonates, alkylnaphthalenesulfonates, olefin sulfonates, alkyl ether sulfonates, alkylsulfates, alkyl ether sulfates, alpha-sulfofatty acid esters, acylaminoalkanesulfonates, acylisethionates, alkyl ether carboxylates, N-acylsarcosinates, alkylphosphates and alkyl ether phosphates. Nonionic surfactants which can be used are alkylphenol polyglycol ethers, fatty alcohol polyglycol ethers, fatty acid polyglycol ethers, fatty acid alkanolamides, EO/PO block copolymers, amine oxides, glyceryl esters of fatty acids, sorbitan esters and alkyl polyglucosides. Cationic surfactants used are alkyltriammonium salts, alkylbenzyldimethylammonium salts and alkylpyridinium salts.

Particular preference is given to using mixtures of anionic and nonionic surfactants.

Component D)

As component D), the system comprises one or more crosslinkers D) which can react with the component B). Preference is given to using aldehydes, isocyanates, epoxides, acrylates, acrylamides, esters, divinylsulfonates, particularly preferably ethanedial, as crosslinkers D).

Component E)

As component E), the system can comprise one or more additives. Possible additives are, in particular, compounds which reduce the shrinkage or the water absorption of the in-situ foam. To reduce the shrinkage, it is possible to use, for example, dimethyldihydrophyethylurea. The water absorption can, for example, be reduced by means of self-crosslinking styrene-acrylate dispersions.

To improve the foamability, it is possible to add viscosity-increasing additives, e.g. starch, modified celluloses or polyvinyl alcohol.

The system does not comprise any volatile organic blowing agents such as low-boiling $C_4$-$C_8$-hydrocarbons, alcohol, ethers, ketones and esters.

To achieve good fire protection, the proportion of organic constituents in the in-situ foam should be very low. Preference is given to using a system in which the proportion of organic constituents is so low that the in-situ foams pass the burning test A2 in accordance with DIN 4102 and have a fire resistance F30 at a thickness of 50 mm and F60 at a thickness of 100 mm. The sum of the solids (nonaqueous fractions) of the components B), C), D) and E) is therefore preferably in the range from 2 to 15% by weight, particularly preferably in the range from 5 to 11% by weight, based on the in-situ foam.

The invention also provides a process for producing an in-situ foam using the above-described components A) to E) of the system and foaming by means of a gas or a gas mixture.

The in-situ foam can be obtained by mixing and foaming an aqueous composition composed of the components A) to E) with a gas or a gas mixture under superatmospheric pressure and action of mechanical forces such as stirring or shearing by means of static mixers. It is also possible to foam the aqueous composition by dispersing an inert gas in the form of fine gas bubbles in it. The introduction of gas bubbles into the aqueous composition can be effected by means of beating, shaking, stirring, whip-stator or rotor apparatuses. Preference is given to using mixtures having stator and/or rotor elements.

As gas or gas mixture, preference is given to using inert gases such as nitrogen, argon, carbon dioxide or oxygen. Particular preference is given to using air.

In order to produce the in-situ foam, an aqueous suspension with a solids content in the range from 30 to 50% by weight is preferably prepared from the components A) to D) and foamed by introducing compressed air having a pressure in the range from 100 to 2000 kPa.

The process preferably comprises the steps
 (a) introduction of a gas or a gas mixture into an aqueous solution or suspension comprising at least the components C),
 (b) optionally mixing-in of further components A) to E) either together or separately by means of one or more mixing elements,
 (c) foaming of the aqueous suspension comprising at least the components A) to C),
 (d) optionally addition of the component D),
 (e) drying to a water content below 0.5% by weight.

In step (a), preference is given to introducing compressed air having a pressure in the range from 100 to 2000 kPa.

The mixing-in of the components A) to E) can be carried out either together or separately by means of one or more mixing elements. The components B) and D) of the system or the premixes comprising these components are preferably stored separately and mixed only on site to produce the in-situ foam. The introduction is preferably carried out via different points of introduction on the apparatus.

The in-situ foam can be produced in commercial foaming apparatuses for in-situ foams. Suitable apparatuses for producing the in-situ foam (F) are shown schematically in FIGS. 1-3.

The apparatus as shown in FIG. 1 comprises three static mixers (SM 1, SM 2 and SM 3) having three metering devices (D1, D2 and D3). The components C) and the gas or the gas mixture are preferably introduced via the metering device (D1), the components A), B) and E) are preferably introduced together via the metering device (D2) and the component D) is preferably introduced via the metering device (D3).

Figure 2:
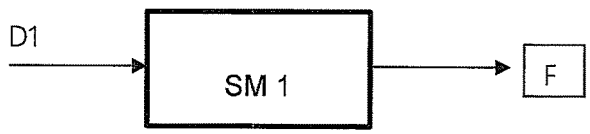
FIG. 2 shows an apparatus with only one static mixer and one metering device.

The apparatus as shown in FIG. 2 comprises only one static mixer (SM 1) with the metering device (D1) for introduction of the aqueous composition composed of components A) to E).

Figure 3:
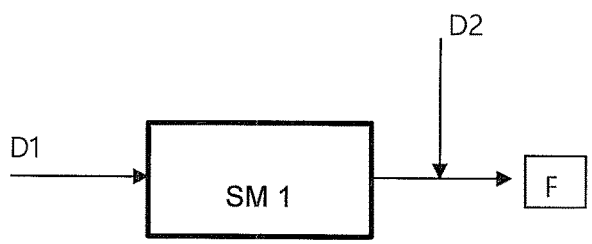
FIG. 3 shows an apparatus similar to FIG. 2, with an additional metering device.

The apparatus as shown in FIG. 3 corresponds to the apparatus shown in FIG. 2 with an additional metering device (D2). Here, the components A), B), C) and optionally E) can be introduced together via the metering device D1 and the component D) can be introduced separately therefrom via the metering device D2.

In general, the components B)-D) are used in the form of aqueous solutions. To adapt the viscosity, further water can be added to individual components or mixtures of components. The aqueous suspension in step (c) preferably has a solids content in the range from 5 to 50% by weight, particularly preferably from 10 to 30% by weight.

The invention also provides an in-situ foam which can be obtained by the process of the invention. The density can be set within a wide range as a function of the foaming apparatus used, the number of mixing elements and the setting of the pressure. The in-situ foam preferably has a density in the range from 10 to 300 kg/m$^3$.

In general, the in-situ foam which can be obtained by the process of the invention has a lower average pore diameter and a narrower pore size distribution compared to a blown foam having the same composition and blown by means of blowing agents. The more homogeneous foam structure of the in-situ foam is also reflected in a lower thermal conductivity. The in-situ foam of the invention preferably has an average pore diameter below 1 mm. The distribution of the pore diameters is preferably in the range 0.2-1 mm. In comparison, the average pore diameter in the blown foam is in the range 1-5 mm and the distribution of the pore diameters is in the range 1-4 mm.

The in-situ foam preferably has a combustion energy, determined in accordance with DIN 51900 part 3, of less than 3.0 MJ/kg, preferably in the range from 0.1 to 2.9 MJ/kg.

The water absorption after storage of the foam specimens in a controlled temperature and humidity chamber at 85% humidity to constant weight is preferably from 1 to 35% by weight, particularly preferably from 5 to 20% by weight.

The shrinkage after storage of the foam specimens in a controlled temperature and humidity chamber at 85% humidity to constant weight is preferably from 0.1 to 10%, particularly preferably from 1 to 7%.

The in-situ foam is preferably firm in air at 20° C. within a period in the range from 5 to 50 seconds, particularly preferably in the range from 10 to 25 seconds, after foaming. The in-situ foam is suitable for thermal insulation and for filling hollow spaces and hollow bodies, in particular for insulating hollow spaces in building constructions, for example by filling double masonry walls. Furthermore, the in-situ foam is suitable for the interior insulation of building constructions, in particular walls, ceilings, ceilings having a crawl space and roofs, for filling hollow blocks with foam to improve the insulation performance, for insulating pipes and engineering components, for the fire-resistant closure of openings through masonry walls for, for example, lead-throughs for lines and also for filling fire doors, doors and window profiles. The in-situ foam is also suitable as fire barrier or part of a fire barrier in buildings or for filling hollow spaces and hollow bodies.

The in-situ foam can be used either alone or in combination with one or more other insulation materials in the form of boards or flocs for these and other applications. Suitable insulation materials are foamed polymers such as expanded foams composed of white or gray, expandable polystyrene (EPS, Styropor®, Neopor®) or extruded styrene foams (XPS, Styrodur®) or polyurethane foams (PUR), foamed elastomers based on neoprene rubber or EPDM, inorganic insulation materials such as mineral fibers, rockwool, glass wool, granulated glass foam, foamed glass, expanded perlite or silicate foams, natural insulation materials such as sheep's wool, flax, soft wood fiber boards, lightweight wood wool construction panels, cork, coconut fiber mats or cellulose. The in-situ foam according to the invention can preferably be used together with mineral wool.

EXAMPLES

Starting Materials:
Component A1 FGD gypsum (from a flue gas desulfurization plant), $CaSO_4.2H_2O$, calcium sulfate dihydrate
Component A2.1 kaolin (from Fluka, uncalcined aluminum silicate, $Al_2Si_2O_5(OH)_4$, pharmaceutical grade)
Component A2.2 Ansilex® 93 (calcined kaolin, not surface-treated, average particle size 0.9 μm)
Component B1.1 Lupamin® 9050 (copolymer of vinylformamide and vinylamine (1:1) having a high molecular weight; 10% strength solution in water, pH about 8, with chloride as counterion)
Component B1.2 Lupamin® 9070 (copolymer of vinylformamide and vinylamine (3:7) having a high molecular weight; 10% strength solution in water, pH about 8, with chloride as counterion)
Component B1.3 Lupamin® 9050 (copolymer of vinylformamide and vinylamine (1:1) having a high molecular weight; 10% strength solution in water, pH about 8, with benzoic+amidosulfonic acid (1:1) as counterion)
Component C1 surfactant mixture of anionic and nonionic surfactant: Disponil FES 32 (sodium lauryl polyether sulfate) and Lutensol AT/30 (fatty acid ethoxylate) in a weight ratio of 1:3;
Component C2 AmphosolCS-50 (cocamidopropyl hydroxysultaine)
Component D1 Glyoxal (ethanedial, oxalaldehyde)
Component D2 Waterpoxy® 1422 (epoxy resin dispersion in water, 53-57%, 2-6 Pa.$)
Component E1 Durapox® NT (two-component reactive resin system with epoxide as resin component and a mixture of isophoronediamine and N-(3-aminopropyl)-N-dodecylpropane-1,3-diamine as hardener component)
Component E2 Acronal® 5044 (aqueous self-crosslinkable dispersion of a copolymer of an acrylic ester and styrene, solids content 55% by weight, film formation temperature Tg-15° C., particle size ~400 nm, pH 6.5-8.5, viscosity 10-100 mPas
Component E3 Fixapret® NF: dimethyldihydroxyethylurea
Component E4 melamine (pure, powder)

Examples 1-10

For examples 1-10, an aqueous solution of the component C was foamed by means of compressed air (2000 kPa) in the first mixing element SM 1 of a set-up as per FIG. 1 having three static mixing elements (SM 1, SM 2, SM 3) having diameters in the range from 5 to 10 mm. A mixture of the components A1, A2, B and E and optionally additional water to set the solids content of the suspension was subsequently added via the second mixing element SM 2 Finally, the component D was introduced in the third mixing element SM 3 and homogeneously mixed in. The foam is conveyed through the further mixing elements to the exit nozzle by the introduction of compressed air into the set-up before the first mixing element. Drying was carried out at 20° C. in air.

Examples 11-16

In examples 11 and 16, the components A) to D) and optionally additional water for setting the solids content of the suspension were foamed together by means of compressed air in an apparatus as per FIG. 2 having a static mixing element (SM 1) having a diameter of 25 mm at an operating pressure of 500 kPa. Drying was carried out at 20° C. in air.

Tables 1 and 2 show the components A to E for producing the in-situ foams in percent by weight, in each case based on the nonaqueous fraction, and the properties of the dried in-situ foam. The solids content (nonaqueous fraction) in percent by weight is based on the mixture of the components before foaming (examples 11 and 16).

The density of the foam specimen was determined by weighing and measurement of length, width and height. The heat of combustion was determined in accordance with DIN 51900 part 3. To determine the water absorption (% by weight), the foam specimens were stored in a controlled temperature and humidity chamber at 85% humidity until the weight was constant. The cutting solidity after foaming was determined by means of a knife and a chronometer. A specimen is considered to be cutting-solid when a piece of the specimen can be cut off by means of the knife and lifted away without this piece losing its shape. To determine the shrinkage, the foam specimens were stored in a control temperature and humidity chamber at 85% humidity until the weight was constant and the dimensional changes were measured.

TABLE 1

Starting materials for the in-situ foams of examples 1-10 in percent by weight, based on the nonaqueous fraction of the components, and properties of the dried in-situ foams

| Component | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| A1 | 55.7 | 32.6 | 58.7 | 58.7 | 62.2 | 58.7 | 58.9 | 60.1 | 59.6 | 59.8 |
| A2.1 | 27.8 | 16.3 | 29.4 | 29.4 | 31 | | 29.3 | 30.0 | 29.7 | 29.8 |
| A2.2 | | | | | | 29.4 | | | | |
| B1.1 | 8.3 | 4.9 | 8.8 | 8.8 | 5 | 8.8 | 4.7 | 7.5 | 3.1 | 9 |
| B1.2 | | | | | | | | | | |
| B1.3 | | | | | | | | | | |
| C1 | 7.6 | 45.8 | 2.5 | 2.5 | 1.4 | 2.5 | 1.3 | 1.3 | 1.3 | 1.3 |
| C2 | | | | | | | | | | |
| D1 | 0.6 | 0.3 | 0.6 | 0.6 | 0.2 | 0.6 | 0.1 | 0.2 | 0.2 | 0.01 |
| D2 | | | | | | | | | | |
| E1 | | | | | | | | | 0.9 | |
| E2 | | | | | | | | | | 6.1 |
| E3 | | | | | 0.3 | | | | | |
| E4 | | | | | | | | 5.6 | | |
| Solids content of suspension [% by weight] | 40 | 26 | 34 | 30 | 45 | 30 | 47 | 41 | 48 | 43 |
| Properties of in-situ foam | | | | | | | | | | |
| Density [kg/m$^3$] | 240.9 | 40.2 | 172.3 | 95.2 | 50.7 | 95.6 | 94.2 | 97.1 | 95.2 | 95.2 |
| Heat of combustion [MJ/kg] | >3 | >3 | <3 | <3 | <3 | <3 | <3 | <3 | <3 | <3 |
| Water absorption [% by weight] | 32 | 33 | 32 | 31 | 33 | 32 | 20 | 15 | 8 | 14 |
| Cutting-solid [sec] | 20 | 22 | 21 | 21 | 22 | 20 | 21 | 19 | 22 | 208 |
| Shrinkage [%] | 8 | 7 | 7 | 8 | 2 | 1 | 7 | 8 | 7 | 7 |
| Thermal cond. λ [mW/m*K] | | | | | 40 | | | | | |

TABLE 2

Starting materials for the in-situ foams of examples 11-16 in percent by weight, based on the nonaqueous fraction of the components, and properties of the dried in-situ foams

| Component | Ex. 11 | Ex. 12 | Ex. 13 | Ex. 14 | Ex. 15 | Ex. 16 |
|---|---|---|---|---|---|---|
| A1 | 62.4 | 62.4 | 62.4 | 62.4 | 62.4 | 62.4 |
| A2.1 | 31.1 | 31.1 | 31.1 | 31.1 | 31.1 | 31.1 |
| A2.2 | | | | | | |
| B1.1 | 5 | 5 | | | 5 | 5 |
| B1.2 | | | 5 | | | |
| B1.3 | | | | 5 | | |
| C1 | 1.4 | 1.4 | 1.4 | 1.4 | | 1.4 |
| C2 | | | | | 1.4 | |
| D1 | 0.2 | 0.2 | 0.2 | 0.2 | 0.2 | |
| D2 | | | | | | 0.2 |
| E1 | | | | | | |
| E2 | | | | | | |
| E3 | | | | | | |
| E4 | | | | | | |
| Solids content of suspension [% by weight] | 45 | 32 | 32 | 32 | 32 | 32 |
| Properties of in-situ foam | | | | | | |
| Density [kg/m$^3$] | 35.2 | 26.9 | 36.1 | 32.7 | 25.8 | 35.9 |
| Heat of combustion [MJ/kg] | <3 | <3 | <3 | <3 | <3 | <3 |
| Water absorption [% by weight] | 16 | 9 | 33 | 17 | 33 | 25 |
| Cutting-solid [sec] | 18 | 21 | 830 | 22 | 20 | 21 |
| Shrinkage [%] | 7 | 8 | 9 | 8 | 7 | 9 |
| Thermal cond. λ [mW/m*K] | | 36 | | | | |

The invention claimed is:

1. A process for producing an in-situ foam, the process comprising providing a system, the system comprising the following components:
from 50 to 98% by weight of one or more inorganic fillers as component A,
from 1 to 48% by weight of one or more water-soluble, cationic polymers as component B,
from 0.5 to 48% by weight of one or more surfactants as component C,
from 0.01 to 5% by weight of one or more crosslinkers as component D, which are capable of reacting with the cationic polymers,
from 0 to 20% by weight of one or more additives as component E,
where the percentages by weight of the components A to E are based on the nonaqueous fraction and the sum of components A to E is 100% by weight and
introducing a gas, or a gas mixture to the system components to produce the in-situ foam;
wherein the providing of the system components comprises preparing an aqueous suspension having a solids content in the range from 30 to 50% by weight prepared from the components A to D, and introducing compressed air having a pressure in the range from 100 to 2000 kPa in to the aqueous suspension.

2. The process according to claim 1, wherein the one or more cationic polymers includes polyvinylamine or a poly(vinylamine-vinylformamide) copolymer.

3. The process according to claim 1, wherein the one or more surfactants includes a mixture of anionic and nonionic surfactants.

4. The process according to claim 1, wherein the one or more crosslinkers includes a dialdehyde crosslinker.

5. The process according to claim 1, wherein the one or more inorganic fillers are selected from calcium sulfate, aluminum silicates, or mixtures thereof.

6. A process for producing an in-situ foam, the process comprising providing a system, the system comprising the following components:
from 50 to 98% by weight of one or more inorganic fillers as component A,
from 1 to 48% by weight of one or more water-soluble, cationic polymers as component B,
from 0.5 to 48% by weight of one or more surfactants as component C,
from 0.01 to 5% by weight of one or more crosslinkers as component D, which are capable of reacting with the cationic polymers,
from 0 to 20% by weight of one or more additives as component E,
where the percentages by weight of the components A to E are based on the nonaqueous fraction and the sum of components A to E is 100% by weight and
introducing a gas, or a gas mixture to the system components to produce the in-situ foam;
wherein the introducing of the gas, or the gas mixture, comprises the introduction into an aqueous solution or suspension comprising at least the one or more components C, followed by
adding components A, B and D, and optionally the component E, either together or separately, with one or more mixing elements to the aqueous solution or suspension,
foaming the aqueous solution or suspension comprising at least the components A to D, and
drying to a water content below 0.5% by weight.

7. The process according to claim 6, wherein the introducing of the gas or gas mixture is the introduction of compressed air having a pressure in the range from 100 to 2000 kPa, and the aqueous solution or suspension has a solids content in the range from 30 to 50% by weight.

8. A process for producing an in-situ foam, the process comprising providing a system, the system comprising the following components:
from 50 to 98% by weight of one or more inorganic fillers as component A,
from 1 to 48% by weight of one or more water-soluble, cationic polymers as component B,
from 0.5 to 48% by weight of one or more surfactants as component C,
from 0.01 to 5% by weight of one or more crosslinkers as component D, which are capable of reacting with the cationic polymers,
from 0 to 20% by weight of one or more additives as component E,
where the percentages by weight of the components A to E are based on the nonaqueous fraction and the sum of components A to E is 100% by weight and
introducing a gas, or a gas mixture to the system components to produce the in-situ foam;
wherein the introducing of the gas, or the gas mixture, comprises the introduction into an aqueous solution or suspension comprising at least the one or more components C, followed by
adding the components A and B, and optionally the component E, either together or separately, with one or more mixing elements to the aqueous solution or suspension,
foaming the aqueous solution or suspension comprising at least the components A to C, and optionally the component E,
adding the component D, and
drying to a water content below 0.5% by weight.

9. The process according to claim 8, wherein the introducing of the gas or gas mixture is the introduction of compressed air having a pressure in the range from 100 to 2000 kPa, and the aqueous solution or suspension has a solids content in the range from 30 to 50% by weight.

10. The process according to claim 1, wherein the in-situ foam is firm in air at 20° C. within a period in the range from 5 to 50 seconds after foaming.

11. The process according to claim 1, wherein the in-situ foam has a density in the range from 10 to 300 kg/m$^3$.

12. The process according to claim 1, wherein the in-situ foam has a heat of combustion of less than 3.0 MJ/kg.

13. The process according to claim 6, wherein the in-situ foam is firm in air at 20° C. within a period in the range from 5 to 50 seconds after foaming.

14. The process according to claim 8, wherein the in-situ foam is firm in air at 20° C. within a period in the range from 5 to 50 seconds after foaming.

15. The process according to claim 6, wherein the in-situ foam has a density in the range from 10 to 300 kg/m$^3$.

16. The process according to claim 8, wherein the in-situ foam has a density in the range from 10 to 300 kg/m$^3$.

17. The process according to claim 6, wherein the in-situ foam has a heat of combustion of less than 3.0 MJ/kg.

18. The process according to claim 8, wherein the in-situ foam has a heat of combustion of less than 3.0 MJ/kg.

19. The process according to claim 6, wherein the one or more cationic polymers includes polyvinylamine or a poly(vinylamine-vinylformamide) copolymer.

20. The process according to claim 6, wherein the one or more inorganic fillers are selected from calcium sulfate, aluminum silicates, or mixtures thereof.

\* \* \* \* \*